March 6, 1962 W. SUNDAY 3,023,457
SAFETY DEVICE FOR TIRE RETREADING MOLDS
Filed July 25, 1960 3 Sheets-Sheet 1

INVENTOR
William Sunday

BY Webster & Webster
ATTORNEYS

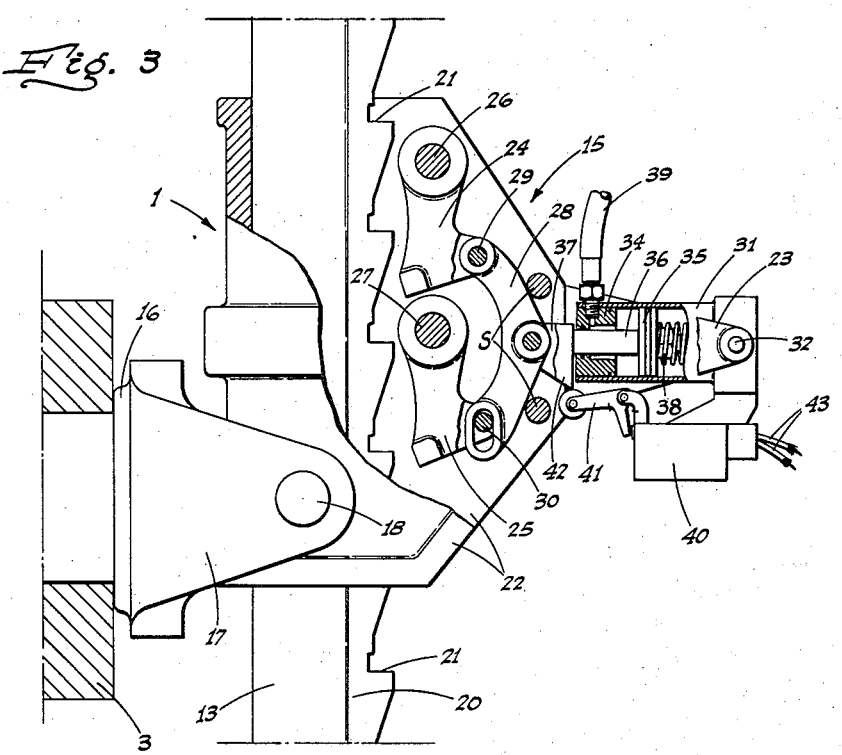
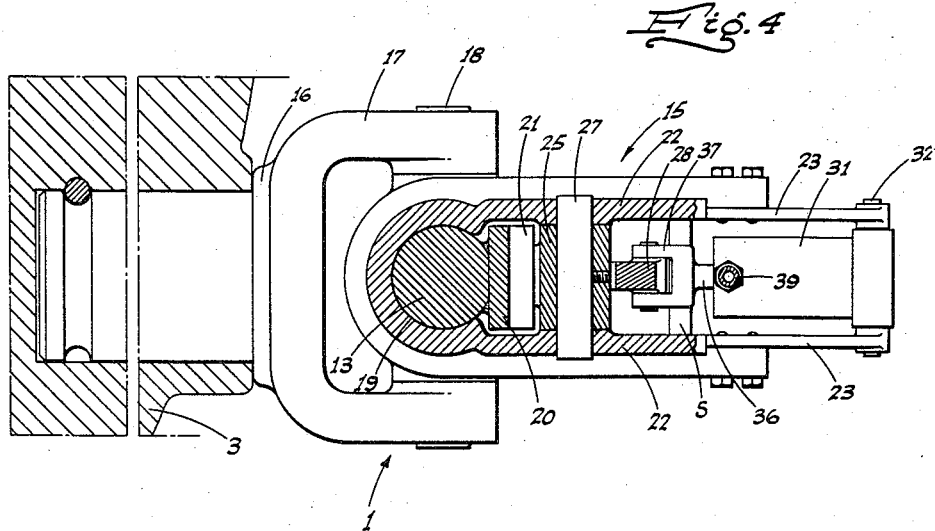

United States Patent Office 3,023,457
Patented Mar. 6, 1962

3,023,457
SAFETY DEVICE FOR TIRE RETREADING
MOLDS
William Sunday, Lodi, Calif., assignor to Super Mold Corporation of California, Lodi, Calif., a corporation of California
Filed July 25, 1960, Ser. No. 45,166
1 Claim. (Cl. 18—18)

The present invention relates to a safety device for a tire retreading mold of the type which includes a hinged upper platen swingable, relative to a lower platen, between a lowered, closed position and a raised, open position by power cylinders connected between such platens.

Heretofore the power cylinders have been relied upon to hold the upper platen in its raised, open position during loading or unloading of the mold, and to thereafter control lowering of said upper platen.

However, in the event of the failure or insufficiency of the fluid pressure supply to the power cylinders it was possible for the upper platen to forcefully and accidentally drop by gravity from its raised, open position, with attendant danger of breakage of the mold, or injury to the operator standing adjacent the mold during loading or unloading thereof.

It is therefore the principal object of this invention to provide, in connection between the upper and lower platens of the mold, a novel safety device operative to automatically—but releasably—lock the upper platen against accidental dropping from any raised position, and which would otherwise occur upon failure of the power cylinders.

Another object of the invention is to provide a practical, reliable, and durable safety device for tire retreading molds, and one which will be exceedingly effective for the purpose for which it is designed.

These objects are accomplished by means of such structure and relative arrangement of parts as will fully appear by a perusal of the following specification and claim.

In the drawings:

FIG. 3 is a similar view, but shows the safety device as disengaged.

FIG. 4 is a sectional plan on line 4—4 of FIG. 2.

Figure 1:
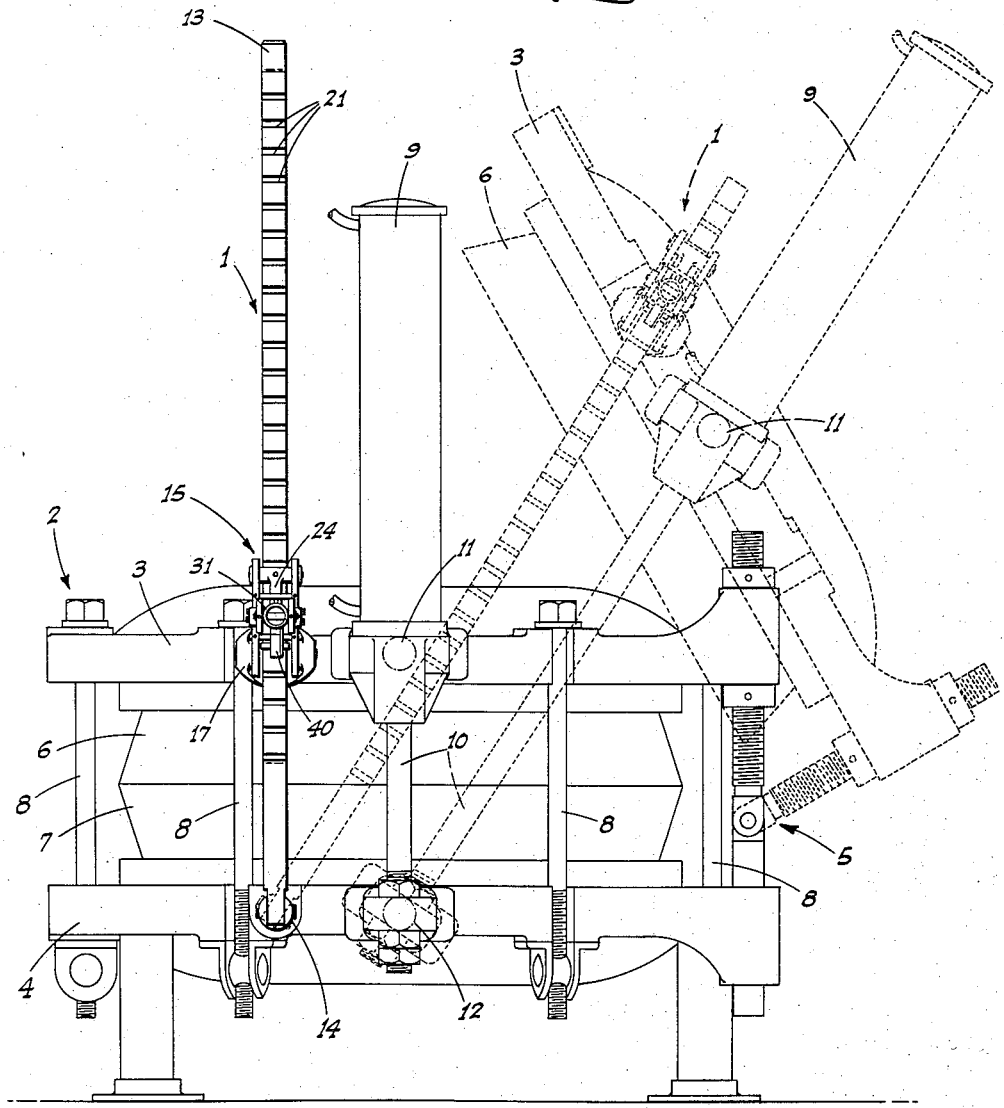
FIG. 1 is a side elevation of a tire retreading mold embodying the safety device; the view showing, in full lines and in dotted lines, the positions of the safety device and upper platen when the mold is closed and open, respectively.

Referring now more particularly to the drawings, and to the characters of reference marked thereon, the safety device is indicated generally at 1, and such device is here illustrated as used in combination with a mold 2 having an upper platen 3 and a lower platen 4 coupled at the rear by a hinge assembly 5 whereby the upper platen 3 is swingable between a lowered closed position, as in full lines in FIG. 1, to a raised open position, as in dotted lines in such figure.

The upper and lower platens 3 and 4 are fitted—as usual, and on adjacent faces—with an upper matrix section and a lower matrix section, indicated at 6 and 7, respectively. The mold is releasably maintained in its closed position by conventional swing-out type mold locking bolts disposed in spaced relation about the circumference of such mold.

On each side thereof—but only one being shown for the purpose of brevity—the mold is provided with an upstanding but inverted, fluid pressure power cylinder 9 which includes a downwardly projecting piston rod 10; the lower end of the power cylinder 9 being connected to the adjacent side of the upper platen 3 by a swivel connection 11, while the lower end of the piston rod 10 is connected to the adjacent side of the lower platen 4 by a swivel connection 12.

Upon simultaneous actuation of the power cylinders 9—one mounted at each side of the mold, as above described—the upper platen 3 is swung between its lowered, closed position and its raised, open position; the power cylinders also serving the purpose of controlling lowering movement of said upper platen.

One of the safety devices 1 is mounted directly ahead of each power cylinder 9 and extends in parallelism therewith; such safety device—which embodies the present invention—comprising the following:

An upstanding shaft 13 is coupled at its lower end to the adjacent side of the lower platen 4 by a swivel connection 14, while intermediate its ends such upstanding shaft extends through a guide and mounting head, indicated generally at 15, coupled to the adjacent side of the upper platen 3 by a swivel connection 16; the latter including an outwardly extending yoke 17 which straddles the inner end portion of the guide and mounting head 15, and which is transversely pivoted in said yoke, as at 18.

The guide and mounting head 15 is formed with a vertical guide bore 19 through which the shaft 13 extends in relatively slidable relation; such bore being open at the front to expose the corresponding portion of the shaft 13. On the front thereof said shaft 13 is fitted with a substantially full-length ratchet bar 20 having upwardly facing ratchet teeth 21; such ratchet bar extending through the guide and mounting head 15 between parallel outwardly extending side plates 22 thereof. The side plates 22 project outwardly a distance beyond the ratchet bar 20, and at their outer ends such side plates include horizontal extension arms 23.

A depending swingable upper pawl 24 and a depending swingable lower pawl 25 are transversely pivoted, as at 26 and 27 respectively, between the side plates 22 adjacent but in front of the ratchet bar 20.

A vertical spanner bar 28 extends between the pawls 24 and 25, being transversely pivoted in connection with the lower front part of each thereof, as at 29 and 30, respectively; there being a loose-play or lost-motion connection provided in association with the pivot 30.

A relatively short horizontal power cylinder 31 is disposed between the extension arms 23, and at its outer end such cylinder 31 is transversely pivotally connected to said extension arms 23, as at 32.

The cylinder 31 includes an outer head 33, an inner head 34, a piston 35 between such heads, and a piston rod 36 which projects from the piston 35, through the head 34, and thence out of the cylinder 31 in the direction of the spanner bar 28, and to which said piston rod 36 is centrally connected by a clevis 37.

A relatively heavy-duty compression spring 38 is disposed in cylinder 31 between the outer head 33 and the inner head 34; such spring being normally operative to advance the piston 35 in a direction to move the piston rod 36 inwardly. This results in corresponding movement of the spanner bar 28 which engages one or the other of the pawls 24 and 25 with a tooth 21 of the ratchet bar 20; the vertical spacing of the ratchet 21 relative to the position of the pawls 24 and 25 being such that the latter will engage in alternation and with a lesser vertical movement than otherwise.

Fluid pressure, which is usually air, is adapted to be fed into the cylinder 31 against the side of piston 35, opposite the spring 38, by means of a valve controlled conduit system, indicated only in part at 39. Upon introduction of fluid pressure into the cylinder 31 the piston travels against and compresses the spring 38, and at the same time the piston rod 36 retracts, pulling outwardly on the spanner bar 28 and releasing the pawl assembly from the ratchet bar.

With the pawl assembly so released, the spanner bar 28 abuts vertically spaced stops S and which then prevent teetering of sad bar and possible reengagement of one or the other of the pawls with the ratchet bar.

Figure 2:
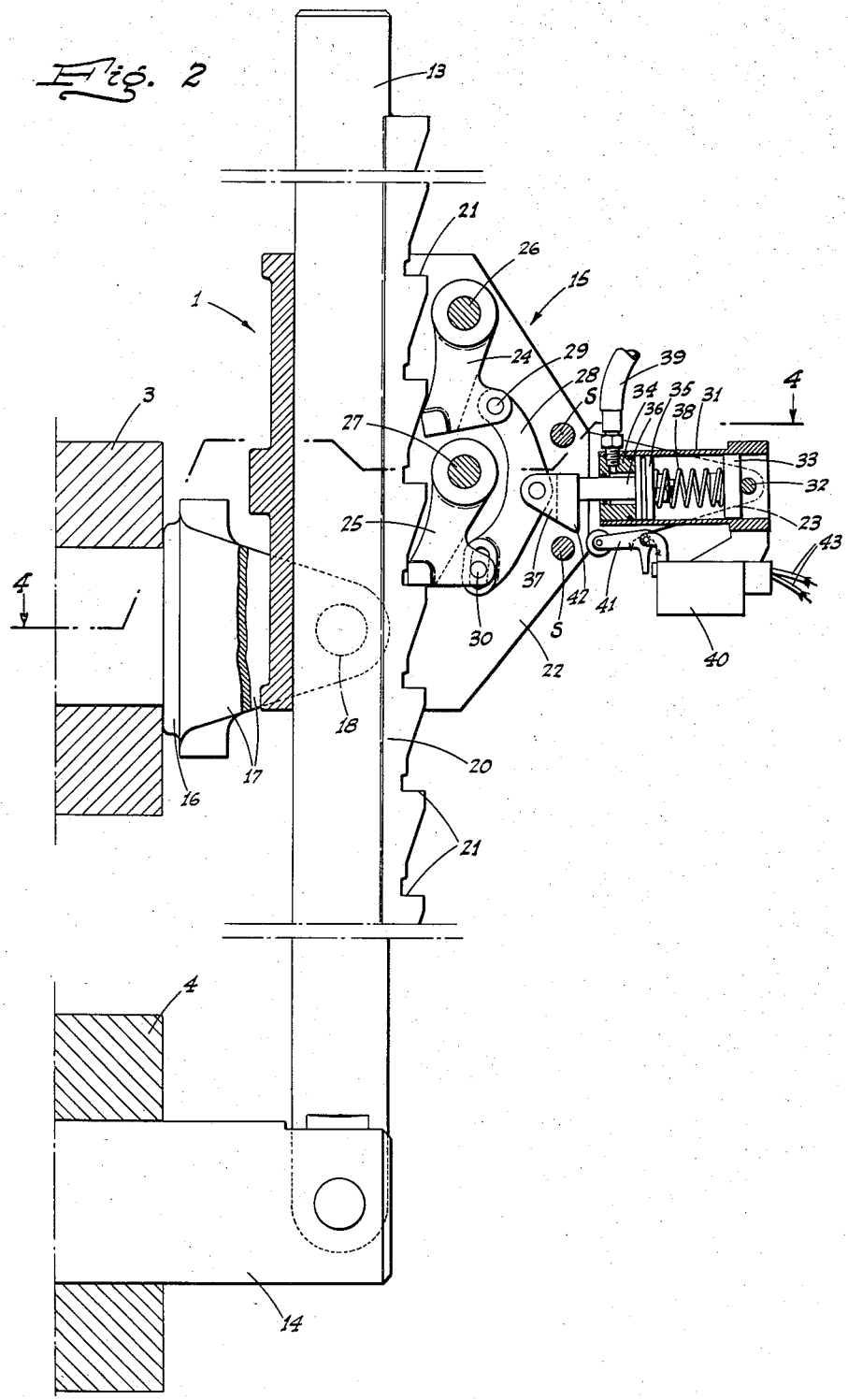
FIG. 2 is an enlarged side elevation, mainly in section, of the safety device as engaged.

In operation of each safety device constructed as above described, the cylinder 31 is normally deenergized so that upon opening of the mold and movement of the upper platen 3 from its lowered, closed position to its raised, open position by the power cylinders 9, and at which time the shaft 13 and included ratchet bar 20 always remain parallel to the adjacent power cylinder 9, the assembly of the pawls 24 and 25 rides up said ratchet bar 20, with such pawls alternately moving onto the ratchet teeth 21 in a progressively upward direction. See FIG. 2. Hence, should the power cylinders 9 fail at any point in the mold opening operation, or when the mold is fully open, the safety device 1 will prevent accidental and forceful dropping of the upper platen 3 by gravity.

Thus, when the mold is fully open, with the upper platen 3 in its raised positon, such upper platen is locked in such position so that the operator can safely load a tire into, or remove same from, the mold, irrespective of whether or not there is—during such time—a failure or insufficiency of the fluid pressure supply to the power cylinders 9.

When it is desired to close the mold by lowering of the upper platen 3, fluid pressure is first introduced into the cylinder 31, whereupon the piston 35 retracts against the spring 38 and pulls the pawls 24 and 25 to a released position relative to the ratchet bar 20, as shown in FIGURE 3. Thereafter, under the control of the power cylinders 9, the upper platen 3 can be lowered to closed position.

If at any point during such lowering of the upper platen the power cylinders 9 should become ineffective by reason of failure or insufficiency of the fluid pressure supply thereto, the safety device 1 will automatically reengage; this for the reason that the fluid pressure supply for the piston 35 is dependent upon continuance of an adequate supply for the power cylinders 9. This is accomplished by a suitable conduit and valve system (not shown).

After the mold is fully closed the fluid pressure is relieved from the cylinder 31, whereupon the safety device 1 reassumes an operative condition for the next mold opening movement of the upper platen 3.

In order that the operator may be cognizant—visually—when the safety device 1 is disengaged the following arrangement is provided:

A switch 40 is attached directly below and lengthwise of the cylinder 31, and such switch includes a pivotally mounted switch control arm 41 having a free end roller, as shown. Upon retraction of the piston 35 and piston rod 36, when the safety device 1 is released, a cam 42 included in clevis 37 engages and depresses the switch control arm 41 which closes switch 40. Upon closing of said switch 40, it acts—through the medium of circuit wires 43—to cause illumination of the electric signal light (not shown) which is mounted in a position for ready viewing by the operator.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent are desired:

In a tire mold which includes a lower platen, an upper platen movable between a lowered closed position and a raised open position, and power mechanism connected between the platens to raise and control lowering of said upper platen; a safety device connected between said platens, comprising an upstanding, upwardly facing ratchet bar attached at its adjacent end to the lower platen outwardly thereof, the ratchet bar thence extending upwardly past and to a point beyond the upper platen, a guide and mounting head attached to the upper platen, the ratchet bar extending intermediate its ends through said head in guided and slidable relation, the head including transversely spaced outwardly projecting side plates between which the teeth of the ratchet bar are exposed, a pair of vertically spaced pawls disposed between the plates and adapted at their lower ends for engagement with the teeth of the ratchet bar, means pivoting the pawls at their upper ends on the plates, a spanner extending between and pivotally connected at its ends to the lower ends of the pawls, a member pivoted at one end on the spanner substantially centrally of its ends, means slidably mounting the member between the plates beyond the spanner and at right angles to the ratchet bar, spring means acting on the member to yieldably advance the spanner and swing the pawls toward the ratchet bar, and normally idle power means acting on said member to retract the spanner and swing the pawls in a bar-releasing direction; the vertical spacing of the pawls being less than the spacing between the alternate teeth of the ratchet bar.

References Cited in the file of this patent

UNITED STATES PATENTS

| 491,049 | Henry | Jan. 31, 1893 |
| 2,198,767 | Glasner | Apr. 30, 1940 |

FOREIGN PATENTS

| 16,435 | Australia | Feb. 20, 1934 |